UNITED STATES PATENT OFFICE 2,569,465

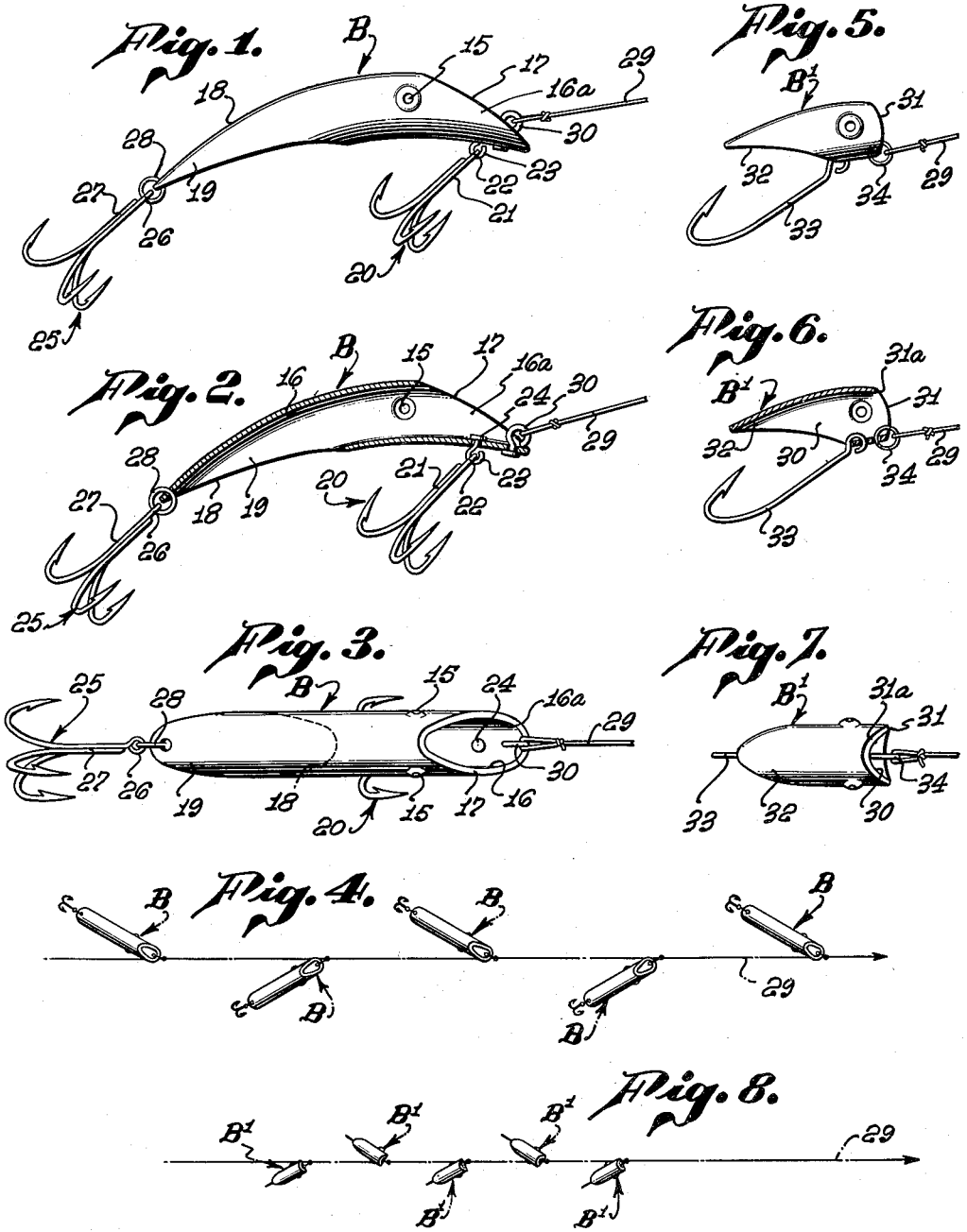

FISH LURE

Lloyd A. Farr, Inglewood, Calif.

Application February 1, 1949, Serial No. 74,030

3 Claims. (Cl. 43—42.06)

My invention relates to fish lures, and it has for a purpose the provision of lure which when used in casting and trolling operations functions to simulate the swimming movements of a minnow or polliwog depending upon the size of the lure.

It is also a purpose of my invention to provide a fish lure by which the swimming movements of a large or small fish used as bait, are simulated by providing a passage in the lure through which water is caused to flow when the lure is dragged through the water, and to thus act on the surfaces of the lure to impart an oscillating motion thereto, and with no rotation thereof as with the conventional lure, so as to maintain the hook or hooks attached to the lure in depending position therefrom to hook a fish in the act of grabbing the lure.

I will describe only two forms of fish lures, each embodying my invention, and will then point out the novel features thereof in claims.

In the accompanying drawings:

Fig. 1 is a view showing in side elevation one form of fish lure embodying my invention and attached to a fishing line.

Fig. 2 is a longitudinal sectional view of the lure shown in Fig. 1.

Fig. 3 is a top plan view of the lure shown in the preceding views.

Fig. 4 is a schematic plan showing the movements of the lure shown in the preceding views as it is dragged through the water by the line.

Fig. 5 is a side elevational view showing another form of lure embodying my invention and attached to a fishing line.

Fig. 6 is a vertical longitudinal sectional view of the lure shown in Fig. 5.

Fig. 7 is a plan view of the lure shown in Fig. 5.

Fig. 8 is a schematic plan showing the motions of the lure of Fig. 5 as it is dragged through the water by a line.

Having specific reference to the drawings, and to the form of lure shown in Figs. 1 to 3, it comprises an elongated body B constructed of metal or other suitable material, and of a length depending upon the size of the live fish bait which it is designed to simulate the swimming movements thereof. Its surfaces are adapted to be painted any suitable color, and portions 15 of the metal may be outstruck and painted to resemble the eyes of a fish.

The body B is curved lengthwise preferably in the form of arc, and may be conveniently cut from a circular piece of metal tubing to provide interiorly thereof a passage 16 extending from end to end of the body. The leading end of the body is cut on an oblique angle as indicated at 17, so that the leading end 16a of the passage 16 is slanted upwardly and rearwardly from the leading end of the body.

The trailing end of the body is reversely cut from the tubing at the lower or concave side thereof, and on an oblique angle, as indicated at 18, and so that the trailing end 19 of the passage 16 is slanted downwardly on an arc extending from a point subtantially medially of the ends of the body.

Adjacent the leading end of the body B a group of fish hooks 20 with their shanks 21 welded to each other, are pivotally connected to the bottom side of the body by an eye 22 on the shanks secured in an eye-bolt 23 on the beaded shank 24 thereof which is rotatably mounted in the body. A second group of fish hooks 25 identically assembled as the hooks 20, are pivotally connected to the trailing end of the body by an eye 26 on the hook shanks 27, and a ring 28 secured in the body.

It will of course be understood that the hooks 20 and 25 do not have to be arranged in groups, as only single hooks may be employed one of each. However, in order that a fish may be hooked when striking the lure from various angles, the two groups of hooks have been provided.

The angler's line 29 is adapted to be connected to the leading end of the body B by an eye-bolt 30 so that in casting or trolling the lure can swing in substantially a horizontal plane to either side of the end of the line and about the eye-bolt as a center.

When trolling the lure by the line 29, or when retrieving the lure after casting, movement of the lure through the water causes the water to enter the front end of the passage and leave through its rear end. Because of the longitudinal curvature of the passage and the angles at which the water enters and leaves the passage, the lure body and the hooks 20 and 25 maintain the positions shown in Fig. 1, but at the same time the lure body swings in a horizontal plane about the eye-bolt 30 as a center. Thus as the lure is dragged by the line it oscillates to simulate the swimming movements of a fish as illustrated in Fig. 4, and at no time does the lure body rotate as with the conventional lure. Manifestly, the hooks 20 and 25 aid in maintaining the lure against rotation.

Depending upon the size of the live fish bait which the lure is designed to simulate the swimming movements thereof, determines the length of the lure body, since the length of the passage 16 controls the rapidity of oscillation of the lure on the line.

For example, in Figs. 5, 6, and 7, a lure is illustrated having a body B1 which is relatively short and tubular to provide an arcuate water passage 30 which is of a corresponding length. The body at its leading end 31 is curved and only slanted slightly rearwardly, and at its top is dished rearwardly as indicated at 31a. The trailing end 32 of the passage 30 has the same contour as that of end 19 of the passage 16 in the first form of lure.

Because of the shortness of the lure body B1 only a single hook 33 is used, and it is pivotally connected to the lower side of the body, as shown. The line 29 is connected to the lower front end of the body B1 by a ring 34 that allows swinging movement of the lure on the line as it is dragged through the water.

In practice, the lure when pulled through the water by the line assumes and maintains the position shown in Fig. 5, by reason of the weight of the hook, and the contour of the ends of the body.

Under the flow of water through the passage 30, the lure is caused to oscillate horizontally about the ring 34 as a center so that under continuous pulling of the lure by the line it describes the path shown in Fig. 8 to simulate the rapid swimming movements of a small live fish such as a polliwog.

Although I have herein shown and described only two forms of lures, each embodying my invention, it is to be understood that various changes and modifications may be made therein without departing from the spirit of my invention and the spirit and scope of the appended claims.

I claim:

1. A fish lure, including: an elongated tubular body having a longitudinally arcuate water passage therethrough, the leading end face of the passage slanting upwardly from the leading end of the body, and the trailing end face of the passage slanting downwardly to the trailing end of the body from a point substantially medially of the ends of the body.

2. A fish lure, including: a tubular body of uniform inside diameter continuously curved throughout its entire length, and having its forward end face slanted from the bottom side to the top side of the body to provide an ovate opening at its forward end, and its rear end face slanted upwardly and forwardly at the bottom side of the body to provide an ovate opening at the bottom side of the body.

3. A fish lure as embodied in claim 2, wherein the slants of said end faces are on arcs of different radii and of different lengths so that said openings are of different lengths.

LLOYD A. FARR.

REFERENCES CITED

The following references are of record in the file of this patent:

UNITED STATES PATENTS

| Number | Name | Date |
| --- | --- | --- |
| 1,611,644 | Johnson | Dec. 21, 1926 |
| 1,812,235 | Carr | June 20, 1931 |
| 2,445,523 | Goldbach | July 20, 1948 |
| 2,484,747 | Russell | Oct. 11, 1949 |